United States Patent [19]

Odawara et al.

[11] Patent Number: 4,665,457
[45] Date of Patent: May 12, 1987

[54] INFORMATION STORAGE DISK CARTRIDGE

[75] Inventors: Kazuharu Odawara; Yoshiaki Tago, both of Yokohama, Japan

[73] Assignee: Kabushiki Kaisha Toshiba, Japan

[21] Appl. No.: 667,464

[22] Filed: Nov. 1, 1984

[30] Foreign Application Priority Data

Nov. 4, 1983 [JP] Japan ................................ 58-207055

[51] Int. Cl.⁴ ............................................ G11B 23/04
[52] U.S. Cl. .................................................. 360/133
[58] Field of Search ................ 360/133, 132; 242/198; 206/444

[56] References Cited

U.S. PATENT DOCUMENTS

| | | | |
|---|---|---|---|
| 2,866,541 | 12/1958 | Ravis | 206/62 |
| 2,919,799 | 1/1960 | Ravis et al. | 206/62 |
| 4,056,245 | 11/1977 | Schoettle et al. | 360/132 |
| 4,106,066 | 8/1978 | Kudo | 360/133 |
| 4,443,874 | 4/1984 | Steenberg | 360/133 |
| 4,546,397 | 10/1985 | Asami et al. | 360/133 |

FOREIGN PATENT DOCUMENTS

| | | |
|---|---|---|
| 2217229 | 9/1974 | France . |
| 2255674 | 7/1975 | France . |
| 2497992 | 7/1982 | France . |

Primary Examiner—Robert S. Tupper
Attorney, Agent, or Firm—Finnegan, Henderson, Farabow, Garrett & Dunner

[57] ABSTRACT

A cartridge for housing a disk-shaped information recording medium to be inserted in a recording and reproduction apparatus. The cartridge includes a first case for enclosing a first half of the disk and a second case for enclosing a second half of the disk. The first and second cases are movable into and out of contact with each other along a pair of disk support members. When the first and second cases are in contact with each other the disk is completely enclosed and protected from contamination. Upon insertion in the recording and reproduction apparatus, the first and second cases are automatically separated by a predetermined distance to expose a radial portion of the disk for recording and reproduction.

18 Claims, 17 Drawing Figures

INFORMATION STORAGE DISK CARTRIDGE

BACKGROUND OF THE INVENTION

1. Field of the Invention

The present invention relates to an information recording medium cartridge for storing an information recording medium such as an optical disk or a video disk.

2. Description of the Prior Art

In recent information processing devices, a small laser spot is formed on a light-reflecting surface of an information recording medium, such an an optical disk or a video disk, to form pits corresponding to input information, thereby recording this information. A laser beam focused on the light-reflecting surface is reflected to a photosenser to reproduce desired information.

An information processing apparatus of this type has advantages of high recording density and high fidelity reproduction. When the surface of the information recording medium is scratched or dusty, or is contamination with fingerprints or other foreign material, however, the optical path of the laser beam is obstructed. As a result, recording and reproduction cannot be properly performed.

A conventional information recording medium, such as an optical disk or a video disk, must be manually removed from a protective case as a cartridge. An operator must carefully load the medium on a loading section, such as a turntable, in the information processing apparatus so as to prevent the medium from being damaged. For this reason, use of the information recording medium results in cumbersome operation.

Another type of information recording medium cartridge has been proposed to protect the information recording medium. The cartridge with the information recording medium therein is inserted in the information processing apparatus, and only the cartridge is removed after the medium is loaded. In this manner, the information recording medium is left in the information processing apparatus. In order to withdraw the information recording medium after reproduction, the emtpy cartridge is inserted in the information processing apparatus so that the information recording medium enters the cartridge and is separated from the information processing apparatus together with the cartridge.

According to this system, the information recording medium is removed from the cartridge in the recording and reproduction mode. If several information recording media are respectively loaded in information processing devices a number of empty cartridges corresponding to the number of the devices or media must be kept on or near the operation desks. When the information recording media are removed from the devices, it is troublesome to locate the specific empty cartridges corresponding to the respective media. When the information recording media are held in the cartridges at random, it is quite difficult and inconvenient to locate a desired information recording medium for later use.

SUMMARY OF THE INVENTION

The present invention has been made in consideration of the above situation, and has as its object to provide an information recording medium cartridge capable of directly loading an information recording medium, such as an optical disk or a video disk, without requiring an operator to handle the information recording medium, and capable of recording and reproducing the information recording medium without separating the information recording medium from the cartridge or ejecting the empty cartridge from the information processing apparatus.

In order to achieve the above and other objects of the present invention, there is provided an information recording medium cartridge comprising a first case having a first storage portion for storing a part of an information recording medium; and a second case having a second storage portion freely brought into contact with or separated from the first case so as to store a remaining part of the information recording medium, whereby the part of the information recording medium is exposed when the second case is separated from the first case.

BRIEF DESCRIPTION OF THE DRAWINGS

The drawings show an information recording medium cartridge according to an embodiment of the present invention, in which.

DETAILED DESCRIPTION OF THE PREFERRED EMBODIMENT

A cartridge according to one embodiment of the present invention will be described in detail with reference to the accompanying drawings.

Figure 1:
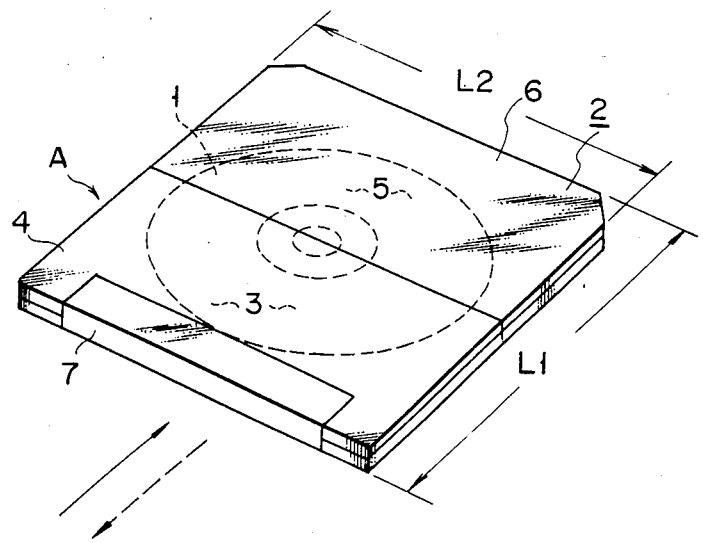
FIG. 1 is a perspective view schematically showing a state wherein a cartridge housing is closed.
Figure 2:
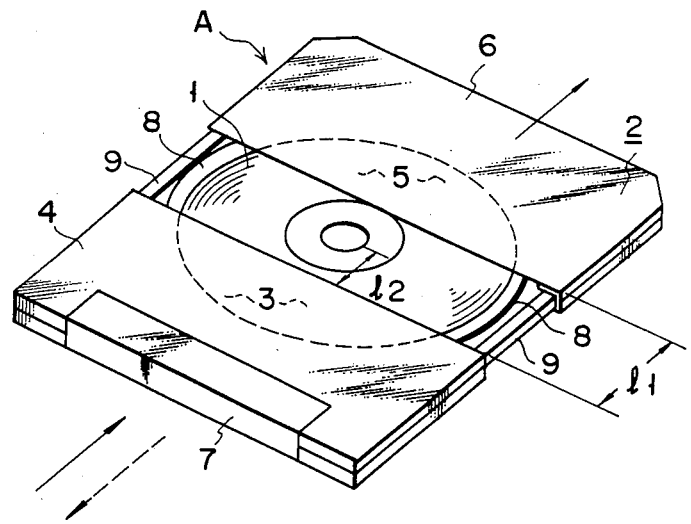
FIG. 2 is a perspective view schematically showing a state wherein the cartridge housing is open.

FIGS. 1 and 2 show an outer appearance of an information recording medium cartridge (hereinafter referred to as a "cartridge") A for storing a disk as an information recording medium. A solid arrow indicates an insertion direction of the cartridge with respect to an information processing apparatus, and a dotted arrow indicates an injection direction thereof. Reference numeral 1 denotes a disk; and reference numeral 2 denotes a cartridge housing for storing the disk 1.

The disk 1 has an outer diameter of about 300 mm, an inner diameter of 35 mm and a thickness of 1 to 8 mm. At least one major surface of the disk 1 has an information forming layer 1a subjected to information recording and reproduction with a laser beam or the like. In this embodiment, the information forming layer 1a is formed on each of the surfaces of the disk 1. The cartridge housing 2 comprises a first case (a rear case) 4 and a second case (front case) 6 freely brought into contact with or separated from the rear case 4. The rear case 4 is located at a rear position along the insertion direction of the cartridge A and has a first storage section 3 for storing a rear half of the disk 1. On the other hand, the front case 6 is located at a front position along the insertion direction and has a second storage section 5 for storing a front half of the disk 1.

The front and rear cases 6 and 4 are made of a plastic material. A label 7 is adhered to the back of the case 4 to indicate the information contents and the sides of the disk 1.

FIG. 1 shows a state wherein the cartridge housing 2 is closed. In this state, the disk 1 is completely covered by the front and rear cases 6 and 4. At the same time, the front case 6 is located with the rear case 4 and cannot be separated in this state. In the closed state, a dimension L1 of the cartridge housing 2 along the insertion direction of the cartridge A is longer than a dimension L2 along a direction perpendicular to the insertion direction. This prevents improper loading of the cartridge A into a recording and reproduction apparatus for processing the information on the disk 1.

FIG. 2 shows a state wherein the cartridge housing 2 is opened. When the cartridge housing 2 is inserted into the recording and reproduction apparatus, the lock of the housing is released, so that the front case 6 may be separated from the rear case 4. A distance l1 between the front and rear cases 6 and 4 in the separated state is longer than the outer diameter of a turntable (to be described later) for rotating the disk 1 or a clamper (to be described later) for fixing the disk 1 on the turntable.

A pair of disk support members 8 are disposed in the cartridge housing 2 and extend along the insertion direction of the cartridge A. The disk support members 8 are located at two sides of the housing 2 in a symmetrical arrangement and can be brought into contact with or separated from the outer peripheral portions of the disk 1. Each disk support member 8 extends across the front and rear cases 6 and 4.

When the front case 6 is separated from the rear case 4, each disk support member 8 is moved from the front and rear cases 6 and 4 along the insertion direction of the cartridge A by a distance L2 which is half of the distance l1 between the front and rear cases 6 and 4. At this moment, each support member 8 is stopped by the front and rear cases 6 and 4. In this manner, the front and rear cases 6 and 4 are stopped while they are spaced apart by the distance l1. The distance between the front and rear cases 6 and 4 will not exceed the distance l1.

Each disk support member 8 is in contact with the peripheral portion of the disk 1 and supports the disk 1 when the front case 6 is brought into contact with the rear case 4. The support member 8 is slightly separated from the peripheral portion of the disk 1 while the front case 5 is separated by the distance l1 from the rear case 4.

The disk 1 is moved upon movement of the disk support members 8 from the front and rear cases 6 and 4. The displacement of the disk support member 8 from the front and rear cases 6 and 4 are defined to be the distance l2. The disk 1 is moved until the central hole of the disk 1 is located substantially at the midpoint between the front and rear cases 6 and 4.

On the other hand, when the cartridge A is closed, the disk support members 8 are moved inside the cases 6 and 4 as the front case 6 is moved toward the rear case 4. The disk 1 is also inserted into the front and rear cases 6 and 4. Finally, the disk 1 is completely covered with the front and rear cases 6 and 4. An edge of the front case 6 is in contact with an edge of the rear case 4 when the cartridge housing 2 is kept closed.

Case support members 9 are disposed in the cartridge A along the insertion direction of the cartridge A and are located outside the disk support members 8 in a symmetrical manner. Each case support member 9 brings the front case 6 into contact with the rear case 4. In this mode, the case support members 9 keep the front and rear cases 6 and 4 are the same level horizontally. In other words, the case support members 9 serve as reinforcing members for keeping the surfaces of the front and rear cases 6 and 4 flat. Each case support member 9 serves as a guide rail for preventing the front case 6 from being inclined with respect to the rear case 4 along the separation direction when the front case 6 is separated from the rear case 4.

The cartridge A for holding the disk 1 therein mainly comprises the front case 6, the rear case 4, the disk support members 8, and the case support members 9.

The cartridge A will be described in detail with reference to FIGS. 3 to 9.

Figure 3:
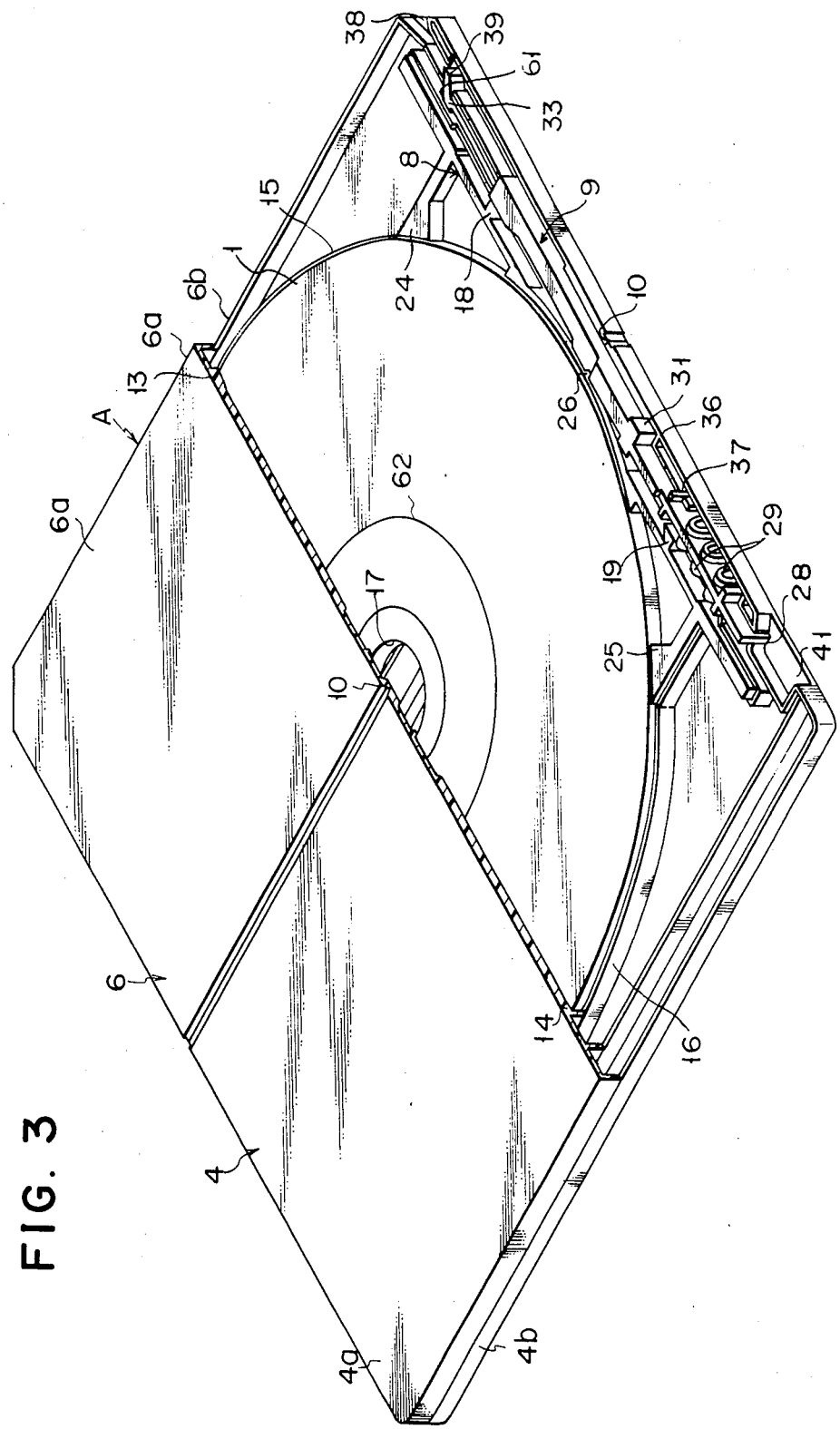
FIG. 3 is a partially cutaway perspective view showing the state wherein the cartridge housing is closed.
Figure 4A:
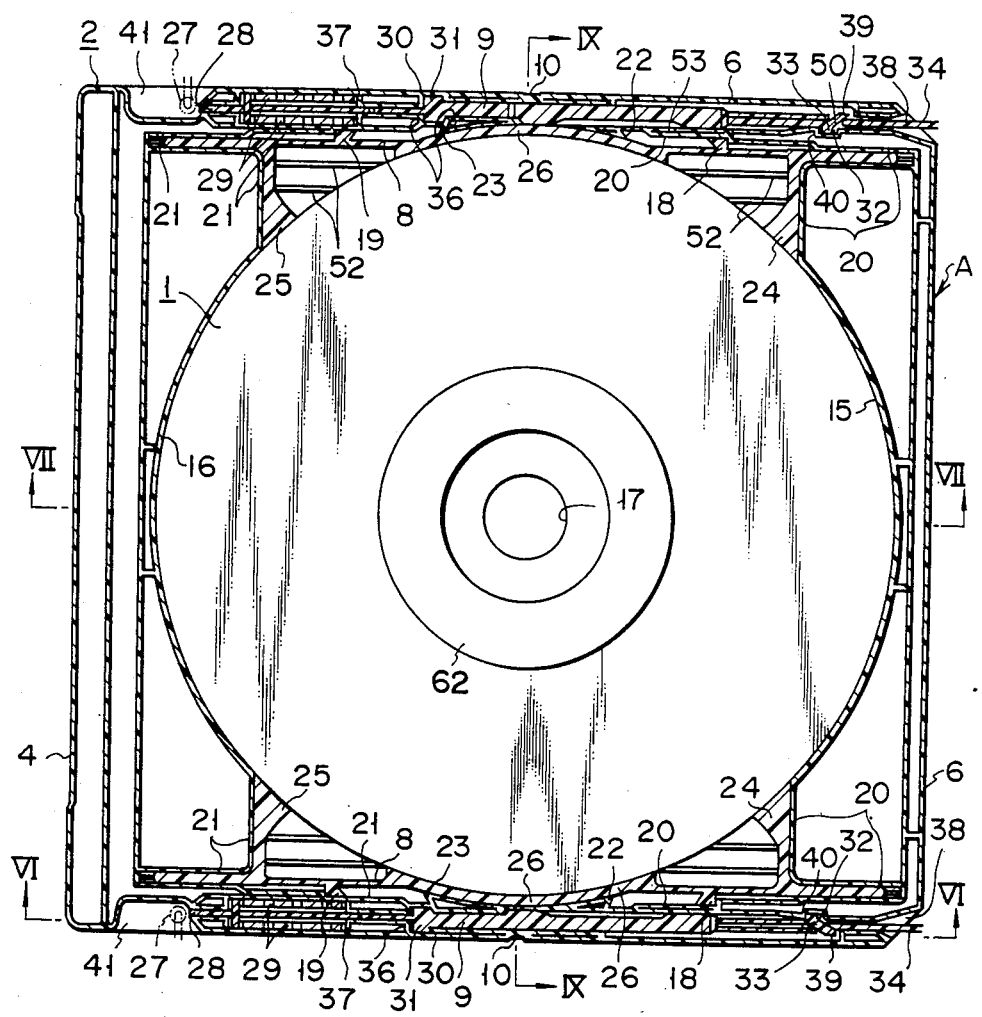
FIG. 4A is a sectional plan view showing the state wherein the cartridge housing is opened.
Figure 4B:
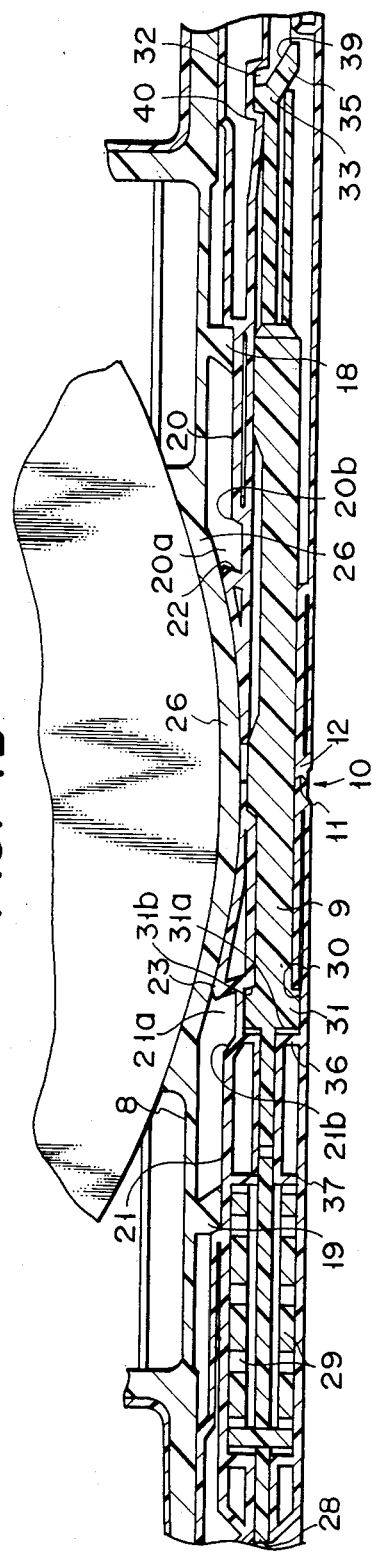
FIG. 4B is a partial sectional view of a closed and locked cartridge.
Figure 4C:
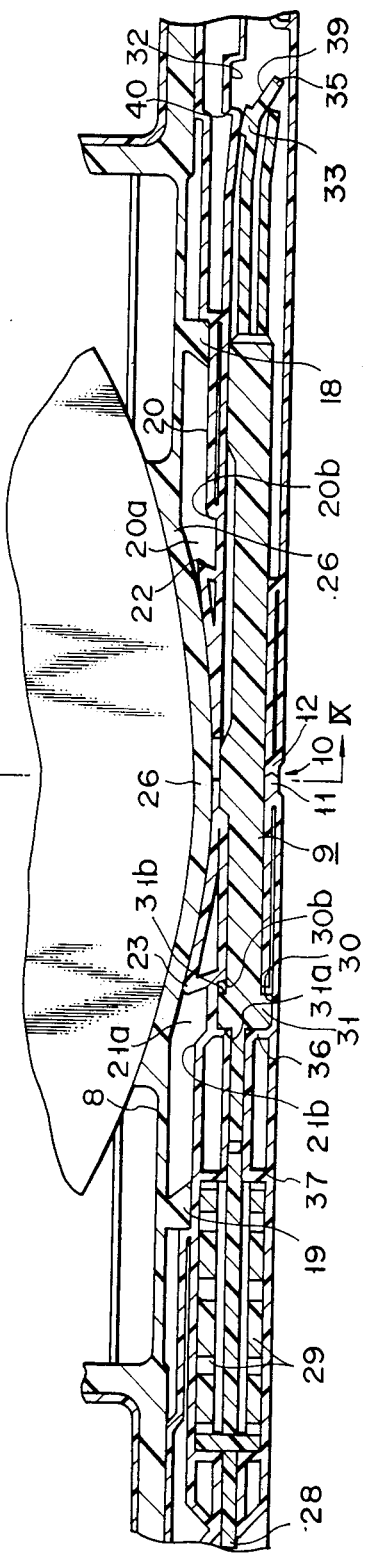
FIG. 4C is a partial sectional view of a closed but unlocked cartridge.
Figure 5:
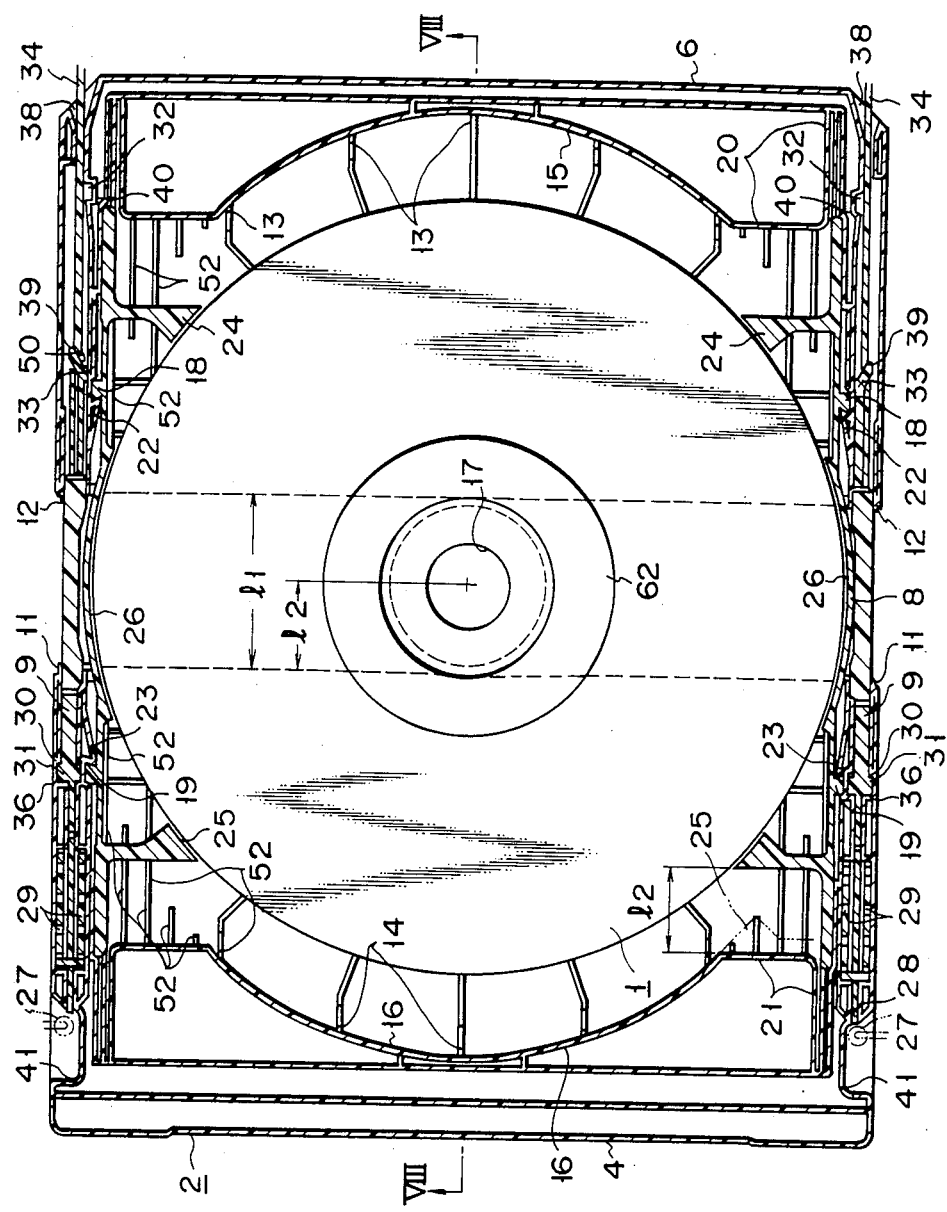
FIG. 5 is a cross-sectional plan view showing the state wherein the cartridge housing is opened.
Figure 6:
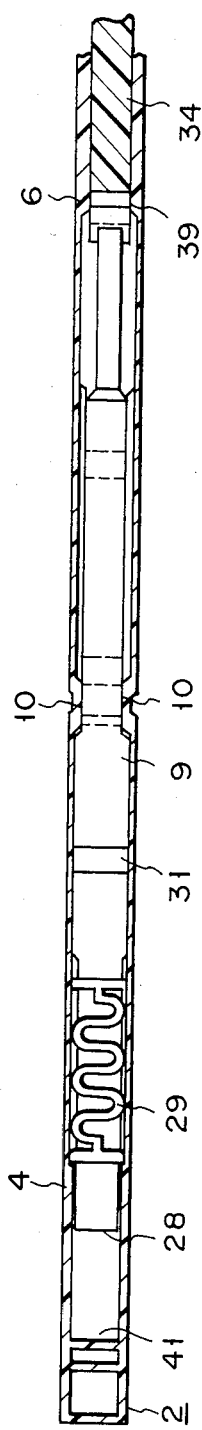
FIG. 6 is a sectional view of the cartridge housing taken along the line VI—VI in FIG. 4A.
Figure 7:
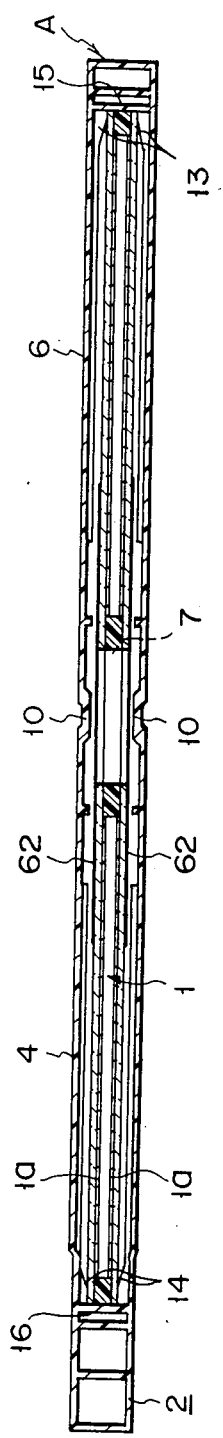
FIG. 7 is a sectional view of the cartridge housing taken along the line VII—VII in FIG. 5.
Figure 8:
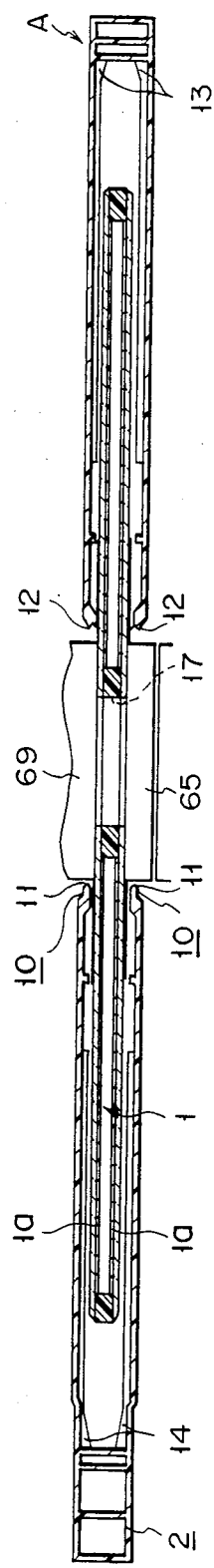
FIG. 8 is a sectional view of the cartridge housing taken along the line VIII—VIII in FIG. 5.
Figure 9:
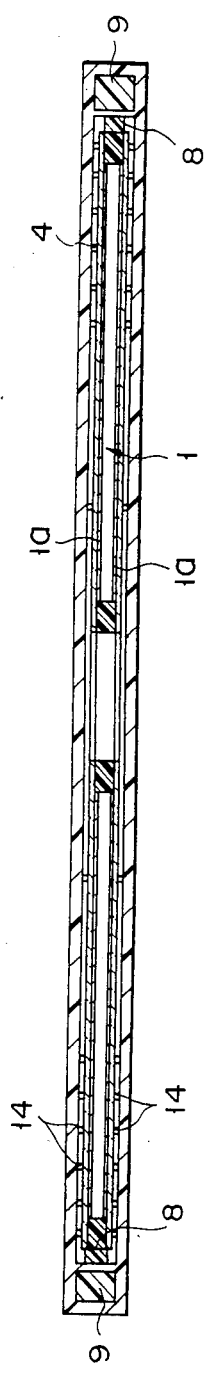
FIG. 9 is a sectional view of the cartridge housing taken along the line IX—IX in FIG. 4A.

FIG. 3 is a perspective view showing a closed state of the cartridge A with the upper surface partially cut away. FIG. 4A is a plan view showing a closed state of the cartridge A with the upper surface cut away, FIG. 4B is a partial sectional view of closed and locked cartridge, and FIG. 4C is a pertial sectional view of closed and unlocked cartridge. FIG. 5 is a plan view showing the opened state of the cartridge with the upper surface cut away. FIGS. 6 to 9 are sectional views of the cartridge A taken along the lines VI—VI (FIG. 4A), VII—VII (FIG. 4A), VIII—VIII (FIG. 5) and IX—IX (FIG. 4A), respectively.

The front case 6 comprises an upper case member 6a and a lower case member 6b. The upper case member 6a is symmetrical with the lower case member 6b with respect to a joint surface so as to constitute the front case 6 as a bag-like member. The upper and lower case members 6a, bb may be joined by means of an adhesive or screws. Similarly, the rear case 4 is constituted by upper and lower case members 4a and 4b which are symmetrical with each other about a joint surface thereof.

The internal space of the front case 6 is defined as the second storage portion 5, and the internal space of the rear case 4 is defined as the first storage portion 3. The opposing edges of the front and rear cases 6 and 4 are open. When the cartridge housing 2 is closed, the front case 6 is brought into contact with the rear case 4 such that the openings of the first and second storage portions 3 and 5 for storing the disk 1 communicate with each other. A fitting portion 10 is defined by joint surfaces of the front and rear cases 6 and 4 to prevent dust from entering the housing if the front case 6 becomes misaligned with the rear case 4. As seen best in FIGS. 4B, 4C and 8, fitting portion 10 comprises a V-shaped projection 11 formed on the rear case 4 and a V-shaped groove 12 which is formed in the front case 6 and which can engage with the projection 11.

Upper and lower fixing ribs 13 and 14 are formed on the front and rear cases 6 and 4 to vertically support the peripheral portion of the disk 1 when the cartridge housing 2 is closed. In this manner, when the cartridge housing 2 is closed, the disk 1 is supported by the upper and lower fixing ribs 13 and 14 in such a manner that the information recording region of the disk will not be brought into contact with the inner surfaces of the cases. Radial fixing ribs 15 and 16 are formed on the front and rear cases 6 and 4, respectively, to regulate the radial movement of the disk 1 when the cartridge housing 2 is closed. When the cartridge housing 2 is opened, however, the disk 1 is disengaged from the vertical fixing ribs 13 and 14 and the radial fixing ribs 15 and 16 and is freely movable in the cartridge housing 2. When the cartridge 2 is closed, the disk 1 is fixed in the cartridge housing 2. When the cartridge housing 2 is opened, the disk 1 is freely movable in the cartridge housing 2.

The disk support members 8 move the disk 1 such that a central hole 17 of the disk 1 is substantially aligned with the midpoint between the front and rear cases 6 and 4 when the cartridge housing 2 is opened. Each disk support member 8 also defines the separation distance l1 between the front case 6 and the rear case 4. Each disk support member 8 has pawls 18 and 19 serving as lock portions for defining the opening distance. The pawl 18 is located inside the front case 6, and the pawl 19 is located inside the rear case 4. The pawls 18 and 19 are in contact with guide ribs 20 and 21 formed in the front and rear cases 6 and 4, respectively, when the cartridge housing 2 is closed, as shown in FIG. 4A.

When the cartridge housing 2 is opened, the pawls 18 and 19 are moved along the guide ribs 20 and 21. Aligning ribs 22 and 23 are formed on the guide ribs 20 and 21 to engage with the pawls 18 and 19, respectively. Recesses 20a and 21a are formed at those portions of the guide ribs 20 and 11 which are located immediately in front of the aligning ribs 22 and 23, respectively. Side surfaces of the ribs 20 and 21 comprise inclined surfaces 20b and 21b, respectively. The pawls 18 and 19 are guided along the inclined surfaces 20b and 21b formed in the ribs 22 and 23 and are fitted in the recesses 20a and 21b when the pawls 18 and 19 reach the aligning ribs 22 and 23, respectively. When the cartridge housing 2 is opened in this manner, each disk support member 8 is moved outside by several millimeters from the disk 1 along the radial direction thereof.

When the pawls 18 and 19 are engaged with the aligning ribs 22 and 23 on the front and rear cases 6 and 4, respectively, the front case 6 will no longer be separated from the rear case 4. When the cartridge housing 2 is closed, each disk support member 8 is arranged such that the corresponding pawls 18 and 19 are moved by the distance l2. In other words, each disk support member 8 is moved to extend outward by the distance l2 from the front and rear cases 6 and 4. Therefore, each disk support member 8 is located at the midpoint between the front and rear cases 6 and 4. The disk support members 8 may be regarded as stationary members. In this case, the front and rear cases 6 and 4 are regarded as separated in opposite directions by a distance l2 with respect to the disk support members 8.

Disk holding portions 24, 25, and 26 are formed in each disk support member 8 to be brought into contact with the peripheral portion of the disk 1. The disk holding portion 24 is located within the case 6 and can be brought into contact with a peripheral portion of the disk 1 which is located with the second storage portion 5. The disk holding portion 25 is located within the rear case 4 and can be brought into contact with a peripheral portion of the disk 1 which is located in the first storage portion 3. The central disk holding portion 26 has an arcuate shape and can be brought into contact with a peripheral portion of the disk 1 which is located between the disk holding portions 24 and 25. In this manner, the disk 1 is moved upon movement of the disk support members 8.

As described above, each disk support member 8 is moved by the distance l2 from the front and rear cases 6 and 4. Therefore, when the cartridge housing 2 is closed and the disk central hole 17 is located at the abutment portion between the front and rear cases 6 and 4, the disk central hole 17 is located at the center between the front case 6 and the rear case 4 when the cartridge housing 2 is opened.

As previously described, when the pawls 18 and 19 are engaged with the aligning ribs 22 and 23, respectively, each disk support member 8 is moved by several millimeters outside the disk 1 along the radial direction thereof. Therefore, the disk support member 8 is then separated by several millimeters outwardly from the disk 1, so that the disk 1 is free from any engagement.

When the disk 1 is free from the front case 6, the rear case 4, and the disk support members 8 in the cartridge A, the disk 1 is brought into contact with the lower inner surfaces of the front and rear cases 6 and 4.

In this state, the upper and lower surfaces of the disk are nearly in contact with the surfaces of the cases 6 and 4. In order to prevent the information recording regions of the disk 1 from being damaged, a ring-shaped label 62 having a thickness of 0.3 to 1 mm is adhered to a central portion of each of the upper and lower surfaces of the disk 1. The portion of the disk 1 which corresponds to the information recording region floats above the corresponding inner surfaces of the cases 6 and 4 due to the presence of these labels 62. In this manner, damage to the disk 1 in the cartridge housing 2 is prevented.

The disk support members 8 are arranged such that the arcuate central disk holding portion 26 and the disk holding portions 24 and 25 are in contact with the disk peripheral portions when the cartridge housing 2 is closed. In this state, the disk 1 cannot be moved along the radial direction thereof. In this condition, the case support members 9 serve to couple the front and rear cases 6 and 4 when the cartridge housing 2 is closed and to keep the cartridge housing 2 closed by the case support members 9. Each case support member 9 extends along the insertion direction of the cartridge A and is present at the outer side of the corresponding disk support member 8. One end (left end in FIGS. 4 and 5) of each case support member 9 is fitted inside the rear case 4 when the upper case member 4a is assembled with the lower case member 4b in the rear case 4. When the case support members 9 are assembled integrally with the rear case 4 and cannot be removed from the rear case 4.

A portion of each case support member 9 which is located in the rear case 4 integrally comprises a rear end portion 28 as a second press member which is mounted outside the rear case 4 and which is urged by a case lock member 27 (to be described later) of the information processing apparatus; a spring 29 as a biasing member; and a projection 31 as a first engaging portion for engaging with a recess 30 as a first engaging portion formed in the rear case 4. A portion of each case support member 9, which is located in the front case 6, integrally comprises a case fixing pawl 33 as a second engaging portion to be engaged with a recess 32 formed in the front case 6. A first press member 35 urged by a case release rod 34 as a case release member mounted on the cartridge loading portion.

As shown in FIGS. 4B and 4C, each case support member 9 can be moved by several millimeters in the rear case 4 along the insertion direction of the cartridge A. In order to limit the displacement of the case support member 9, an aligning rib 36 is formed on the rear case 4 to define an end face of the recess 30 engaged with the corresponding projection 31. A length of the recess 30 along the insertion direction is longer by several millimeters than the thickness of the projection 31 along the insertion direction.

The free end of the spring 29 of each case support member 9 abuts against a spring fixing rib 37 in the rear case 4. When the case support members 9 are mounted in the rear case 4, the corresponding springs 29 are slightly compressed. Therefore, each spring 29 biases the corresponding case support member 9 in the ejection direction of the cartridge A. As shown in FIG. 4C, a surface 31a of the projection 31, which is located at the side of the spring 29, abuts against the corresponding aligning rib 36, so the cartridge A will not be normally moved along the ejection direction. In the state shown in FIG. 4C, the case fixing pawl 33 is disengaged from the recess 32, and hence the rear case 4 is not locked with the front case 6.

When the cartridge housing 2 is closed and the rear case 4 is locked with the front case 6, the case fixing pawl 33 mounted at the distal end of each case support member 9 is engaged with a case fixing pawl rib 40 defining an end face of the process 32 of the front case 6. In this state, each case support member 9 is pushed to the right from the state shown in FIG. 4C to the state shown in FIG. 4B, and the corresponding spring 29 is compressed to bias the front case 6 toward the rear case 4. At the contact portion between the front and rear cases 6 and 4, the projection 11 is firmly engaged with the groove 12. As a result, the disk 1 is completely covered by the cartridge housing 2.

When the cartridge housing 2 is closed and locked, a small space is formed between a surface 31b of the projection 31 and a surface 30b of the recess 30. Even if the front case 6 is removed by a strong force from the rear case 4, the surface 31b of the projection is moved and abuts against the surface 30b of the recess 30, so that the front case 6 is separated only slightly from the rear case 4. In this manner, an excessive force need not be applied to the springs 29. When the separating force acting between the front and rear cases 6 and 4 is stopped, they are returned to the initial state by the biasing forces of the springs 29.

In order to open the cartridge housing 2 from the state shown in FIG. 4B, the case fixing pawls 33 of the case support members 9 are disengaged from the case fixing pawl ribs 40 defining the end faces of the recesses 32 of the front case 6, respectively. For this purpose, a case release rod insertion port 38 is formed at each front portion of the front case 6 to oppose the distal end of the corresponding case support member 9. The thin case release rods 34 are inserted in the corresponding insertion ports 38 to be urged against inclined surfaces 39 of the first press portions 35 of the case support members 9. Then, the first press portions 35 are moved outside of the front case 6, so that the case fixing pawls 33 are disengaged from the case fixing pawl ribs 40, respectively.

When the case fixing pawls 33 are released from the ribs 40, the case support members 9 move inward by several millimeters toward the rear case 4 by means of the biasing forces of the tension springs 29. In this state, the housing is maintained in the unlocked state.

On the other hand, in order to lock the housing 2 from the unlocked state shown in FIG. 4C, the case fixing pawls 33 are engaged with the corresponding case fixing pawl ribs 40. Since the case support members 9 have been moved by several millimeters toward the rear case 4 by means of the springs 29, respectively, the case fixing pawls 33 will not be engaged with the ribs 40 by only bringing the abutment portion of the rear case 4 into contact with that of the front case 6, as shown in FIG. 4C. In view of this, a recess 41 is formed in each portion (of the rear case 4) where the corresponding rear end portion 28 of the case support member 9 is exposed.

While the abutment portion of the rear case 4 is kept in contact with that of the front case 6, the rear end portions 28 of the case support members 9 are pushed several millimeters by the case lock members 27 (schematically shown in FIG. 4A) along the front case 6, thereby engaging the case fixing pawls 33 and the ribs 40. The case fixing pawl 33 of each case support member 9 has an elastic property and is inserted in the corresponding recess 32. Therefore, the case fixing pawl 33 will not be disengaged from the case fixing pawl rib 40 unless the inclined surface 39 is pushed.

The case support members 9 serve not only to bring the front case 6 into contact with the rear case 4 but also to keep the surfaces of the front and rear cases 6 and 4 flat. The case support members 9 also serve as guide rails for the front and rear cases 6 and 4 when the cartridge housing 2 is opened and closed.

In order to insert the disk 1 in an empty cartridge housing 2, the pair of case support members 9 are assembled in the rear case 4, and the pair of disk support members 8 are inserted therein. The disk 1 is inserted in, and surrounded by, the disk support members 8. Finally, the distal end portions of the disk support members 8 mounted in the rear case 4 and the case support members 9 are respectively inserted in the openings of the front case 6. In this manner, the disk support members 8 are elastically deformed, and the pawl 18 is moved over the aligning ribs 22, thereby mounting the disk support members 8 in the front case 6.

On the other hand, in order to remove the disk 1 from the cartridge housing 2, the following operation is performed. The case fixing pawls 33 are disengaged from the corresponding ribs 40, and the cartridge housing 2 is opened halfway. The thin rods are respectively inserted in the openings to disengage the pawls 18 from the aligning ribs 22 to separate the front case 6 from the rear case 4.

The construction and operation of a recording and reproduction apparatus B for the cartridge A will be briefly described with reference to FIGS. 10, 11 and 12A to 12D.

Figure 10:
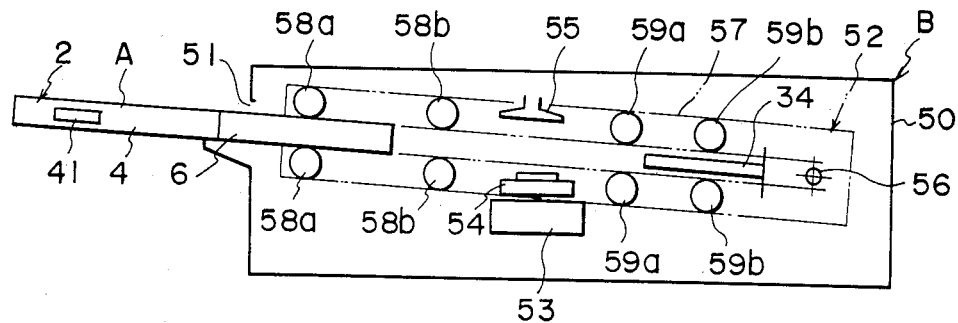
FIG. 10 is a side view schematically showing a state wherein the cartridge is inserted in a cartridge processing apparatus.
Figure 11:
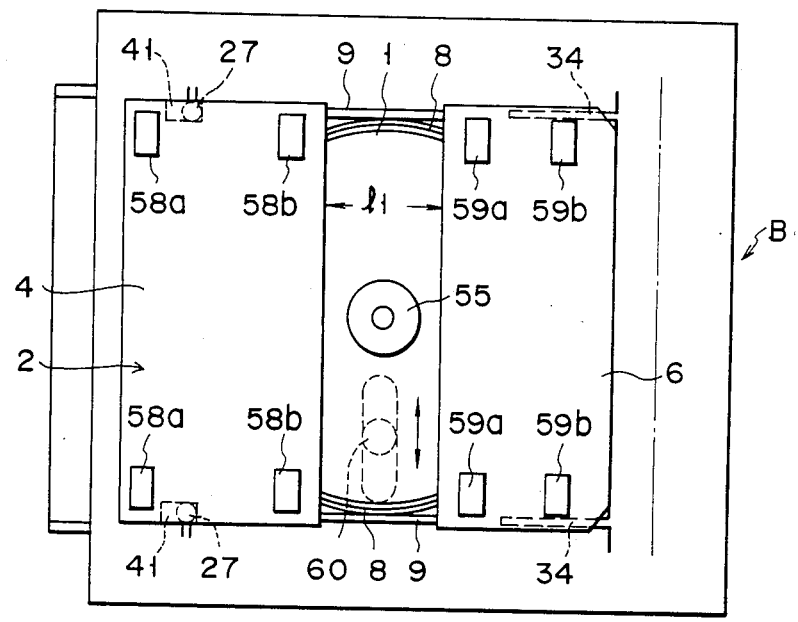
FIG. 11 is a plan view schematically showing a state wherein the cartridge is loaded in a cartridge processing apparatus.

FIG. 10 is a side view showing the schematic configuration of the recording and reproduction apparatus B, and FIG. 11 is a plan view schematically showing a state wherein the cartridge A is inserted.

Referring to FIG. 10, reference numeral 50 denotes an apparatus housing with a cartridge insertion opening 51 at its one side. A cartridge load and eject mechanism 52 is built into the apparatus 50 to load the cartridge A inserted through the cartridge insertion port 51 in the apparatus housing B or to eject the cartridge A from the cartridge insertion port 51.

A turntable 54 driven by a motor 53 and a clamper 55 for clamping the disk 1 to the turntable 54 are arranged substantially at the center of the housing 50.

The cartridge load and eject mechanism 52 is pivotally mounted on a frame 57 through a pivot pin 56. The frame 57 is pivoted by a frame vertical drive mechanism between a horizontal state and an inclined state. The frame vertical drive mechanism comprises rack and a pinion (not shown) or the like. The cartridge load and eject mechanism 52 comprises front portion convey rollers 58a and 58b and rear portion convey rollers 59a and 59b. The pair of case release rods 34 and the pair of case stoppers 27 as case lock members (FIG. 4) are mounted on the frame 57.

Referring to FIG. 11, reference numeral 60 denotes a record and play head. The head 60 is radially driven along the disk 1. The load and eject operation of the recording and reproducing apparatus will be described hereinafter.

Figure 12A:
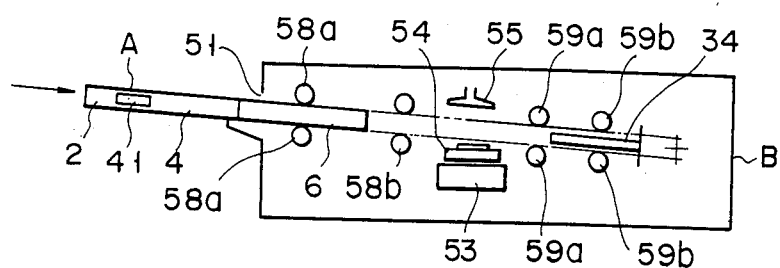
FIGS. 12A to 12D are schematic side views sequentially showing the steps from insertion of the cartridge in to a cartridge processing apparatus to ejection thereof.

As shown in FIG. 12A, the cartridge A is manually inserted in the recording and reproduction apparatus B by a distance corresponding to the front half of the cartridge A. The convey rollers 58a, 58b, 59a and 59b are rotated to automatically convey the cartridge A into the apparatus B. When the cartridge A is inserted to some extent in the recording and reproduction apparatus B, the cartridge A is moved such that the case release rods 34 in the apparatus B are respectively inserted in the insertion ports 38 in the cartridge housing 2.

As previously described, the inclined surfaces of the cartridge A are urged outward by the case release rods 34, respectively. The case fixing pawls 33 are disengaged from the ribs 40 on the front case 6, respectively. The front case 6 is unlocked from the rear case 4 so that the front case 6 can be separated from the rear case 4.

The convey rollers 58a and 58b are stopped, while only the convey rollers 59a and 59b are rotated. In other words, the rear case 4 is stopped while the front case 6 continues to move. Therfore, the front case 6 is separated from the rear case 4 along the insertion direction of the cartridge A. The rear case 4 will not be moved forward since the front end face of the pawl 33 of the case support member 9 abuts against the case release rod 34. The case stoppers 27 in the recording and reproduction apparatus B are inserted in the pair of recesses 41 formed at the two sides of the rear case 4, respectively, so that the rear case 4 will not move backward. In this manner, the rear case 4 is fixed in position in the apparatus B.

Figure 12B:
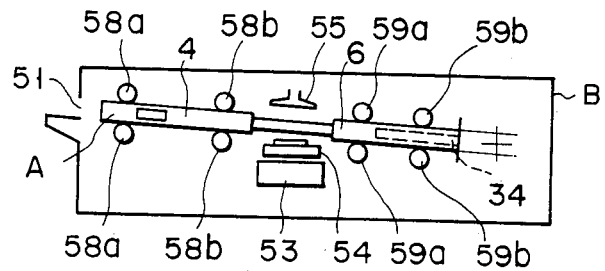
Figure 12C:
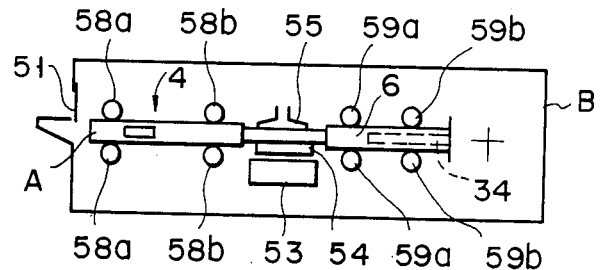

The front case 6 is moved by the disk support members 8 to a position where the distance between the front and rear cases 6 and 4 is extended to the distance l1 and the rollers 59a and 59b are then stopped (state in FIG. 12B). Under these conditions, the central hole 17 of the disk 1 is located substantially at the midpoint between the front case 6 and the rear case 4. The rollers 58a, 58b, 59a and 59b and the cartridge A are pivoted counterclockwise about the pivot pin 56 and are moved downward. The disk 1 is placed on the turntable 54. The frame 57 is moved downward such that the upper and lower surfaces of the cases 4 and 6 of the cartridge A will not be brought into contact with the surfaces of the disk 1 and are fixed in position. The disk 1 is clamped by the clamper 55 on the turntable 54 (state in FIG. 12C). The distance l1 between the front case 6 and the rear case 4 is longer than a diameter of the turntable 54 or clamper 55.

The front case 6 is separated from the rear case 4 along the insertion direction of the cartridge A. The record and play head 60 is moved in a direction perpendicular to the cartridge housing separation direction, i.e., in a direction parallel to the joint surface of the cases 4 and 6 so as to read or reproduce information from the disk 1. When recording or reproduction is completed, the clamper 55 is moved upward from the disk 1, and the rollers 58a, 58b, 59a and 59b and the cartridge A are moved upward to the same level as in the insertion mode.

Only the rear portion convey rollers 59a and 59b are rotated, and the front case 6 is moved along the ejection direction of the cartridge A. In this manner, the front case 6 is brought into contact with the rear case 4. When the front case 6 is moved along the ejection direction while it is kept in contact with the rear case 4, the case stoppers 27 fitted in the corresponding recesses 41 of the rear case 4 urge the rear end portions 28 of the case support members 9 toward the front case 6. Therefore, the cartridge housing 2 is locked in the same manner as described above.

Figure 12D:
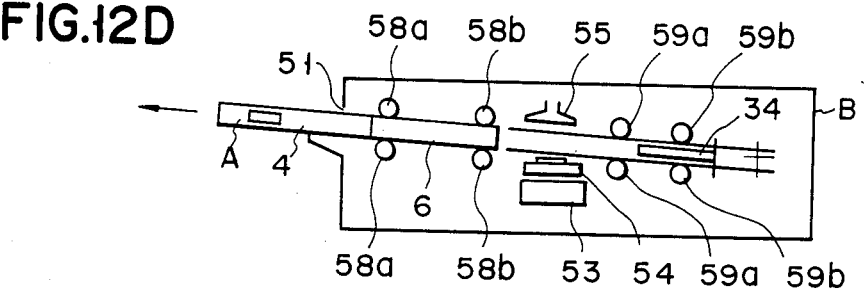

The case stoppers 27 are removed from the recesses 41 of the rear case 4, respectively, and the rollers 58a and 58b are rotated in the reverse direction. Thereafer, as shown in FIG. 12D, the rollers 58a, 58b, 59a and 59b are stopped when the cartridge A is ejected halfway from the recording and reproduction apparatus B. The operator then removes the cartridge A from the recording and reproduction apparatus B.

According to this embodiment, the following effects are obtained:
(1) The operator need not touch the disk 1 itself.
(2) An empty cartridge A need not be ejected after the cartridge is inserted in the apparatus B.
(3) In addition to effect (2), the correspondence between the disk 1 and the empty cartridge A need not be considered.
(4) Holes and recesses in the cartridge are small, thus providing a good appearance.

When the cartridge housing 2 is locked, movement of the disk 1 is limited in the cartridge 2. The disk 1 is rotated when the cartridge housing 2 is opened. Therefore, when the disk is not in use, it will not be damaged.

Since the central hole of the disk 1 is located substantially at the midpoint between the cases when the cartridge housing 2 is opened, a separation distance between the front and rear cases can be minimized. As a result, the information processing time can be shortened, and the opening and closing operation of the cartridge can be properly performed.

The present invention is not limited to the particular embodiment described above. In the above embodiment, the cartridge housing 2 is divided into the first case (rear case) 4 and the second case (front case) 6. The construction of the cartridge housing 2 is not limited to the above arrangement. In addition, in the above embodiment, the cases are separated along a line perpendicular to the insertion direction of the cartridge. However, the separation portion is not limited to this.

The tension springs 29 are integrally formed with the corresponding case support members to bias the case support members 9 along the predetermined direction.

The springs 29, however, may be prepared as separate components.

In the above embodiment, the fitting portion 10 disposed at the abutment portion between the first and second cases 4 and 6 to prevent misalignment between the first and second cases 4 and 6 comprises the V-shaped projection 11 and the V-shaped recess 12. The shapes of the projection and the recess 12, however, are not limited to the V shape, but maybe extended to a U shape or a similar shape.

Various other changes and modifications may be made within the spirit and scope of the invention.

As has been apparent from the above description, the present invention provides an information recording medium cartridge for storing an information recording medium, comprising: a first case having a first storage portion for storing part of an information recording medium; and a second case having a second storage portion freely brought into contact with or separated from the first case so as to store a remaining portion of the information recording medium, whereby the part of the information recording medium is exposed when the second case is separated from the first case. Therefore, the operator need not directly touch an information recording medium such as an optical disk or a video disk and can easily load the information recording medium in the information processing apparatus. The information recording medium will not be separated from the cartridge. An empty cartridge need not be removed from the information processing apparatus after loading the medium. The operator need not consider a noncorrespondence between the empty cartridge and the information recording medium. The cartridge according to the present invention can be properly handled with ease.

What is claimed is:

1. A cartridge for protecting an information storage disk, comprising:
   a cartridge housing including a first case having a first storage portion with an open end for receiving a first part of said disk and a second case having a second storage portion with an open end for receiving a second part of said disk, said open end of said first case facing said open end of said second case; and
   means for guiding movement of said first and second cases substantially linearly between a closed state, in which said open ends of said first and second cases are in contact and said first and second cases enclose said disk, and an opened state, in which said open ends of said first and second cases are spaced apart by a preselected distance to expose a preselected area of said disk between said first and second cases.

2. The cartridge according to claim 1, wherein each of said first and second storage portions has a capacity to store a different half of said disk.

3. The cartridge according to claim 2, wherein said preselected exposed area is defined by a surface portion of said disk which extends along a radial direction thereof so as to include at least a central portion of said disk.

4. The cartridge according to claim 1, wherein said disk has an information formation layer on at least one major surface thereof, said information formation layer being adapted for the recording and reproduction of information.

5. The cartridge according to claim 4, wherein said information formation layer is adapted to be subjected to recording and reproduction with a laser beam.

6. The cartridge according to claim 1, further including means for supporting said disk within said cartridge housing, said disk supporting means preventing rotation of said disk when said first and second cases are in said closed state and enabling rotation of said disk when said first and second cases are in said opened state.

7. The cartridge according to claim 6, wherein said disk supporting means includes first and second disk support members slidably mounted in said cartridge housing, each of said disk support members extending in the direction of movement of said first and second cases, being disposed to clamp said disk, and having a first end and a second end, said first end of each of said disk support members being located in said first case and said second end of each of said disk support members being located in said second case.

8. The cartridge according to claim 7, further comprising means for regulating the distance between said open ends of said first and second cases in said opened state.

9. The cartridge according to claim 1, further comprising isolating means, disposed between contacting portions of said first and second cases, for isolating said first and second storage portions from an external atmosphere when said first case is in contact with said second case.

10. The cartridge according to claim 9, wherein each of said first case and said second case includes an edge for contacting the edge of the other of said first case and said second case, and wherein said isolating means includes a projection formed in said edge of said first case and a groove formed in said edge of said second case, said projection being engaged in said groove when said edge of said first case contacts said edge of said second case.

11. A cartridge for protecting an information storage disk, comprising:
   a cartridge housing including a first case having a first storage portion with an open end for receiving a first part of said disk and a second case having a second storage portion with an open end for receiving a second part of said disk, said open end of said first case facing said open end of said second case;
   means for guiding movement of said first and second cases between a closed state, in which said open ends of said first and second cases are in contact and said first and second cases enclose said disk, and an opened state, in which said open ends of said first and second cases are spaced apart to expose a preselected area of said disk between said first and second cases;
   means for supporting said disk within said cartridge housing, said disk supporting means preventing rotation of said disk when said first and second cases are in said closed state and enabling rotation of said disk when said first and second cases are in said opened state, said disk supporting means including first and second disk support members slidably mounted in said cartridge housing, each of said disk support members extending in the direction of movement of said first and second cases, being disposed to clamp said disk, and having a first and and a second end, said first end of said disk support members being located in said first case and said second end of each of said disk support members being located in said second case; and means for regulating the distance between said open ends of said first and second cases in said open state, said regulating means including first and second engaging portions disposed on said first support member, third and fourth engaging portions disposed on said second support member, first and second engaged portions disposed in said cartridge housing for engagement with said first and second engaging portions respectively, and third and fourth engaged portions disposed in said cartridge housing for engagement with said third and fourth engaging portions respectively.

12. The cartridge according to claim 11, wherein said first and third engaging portions and said first and third engaged portions are located in said first case and wherein said second and fourth engaging portions and said second and fourth engaged portions are located in said second case.

13. The cartridge according to claim 11, wherein said open end of each of said first and second cases includes an edge for contacting the edge of the other of said first and second cases, and wherein the center of said disk is positioned substantially equidistantly from said edges of said first and second cases when said first and second cases are in said opened state.

14. A cartridge for protecting an information storage disk, comprising:

a cartridge housing including a first case having a first storage portion with an open end for receiving a first part of said disk and a second case having a second storage portion with an open end for receiving a second part of said disk, said open end of said first case facing said open end of said second case;

means for guiding movement of said first and second cases between a closed state, in which said open ends of said first and second cases are in contact and said first and second cases enclose said disk, and an opened state, in which said open ends of said first and second cases are spaced apart to expose a preselected area of said disk between said first and second cases;

means for supporting said disk within said cartridge housing said disk supporting means preventing rotation of said disk when said first and second cases are in said closed state and enabling rotation of said disk when said first and second cases are in said opened state, said disk supporting means including first and second disk support members slidably mounted in said cartridge housing, each of said disk support members extending in the direction of movement of said first and second cases, being disposed to clamp said disk, and having a first end and a second end, said first end of each of said disk support members being located in said first case and said second end of each of said disk support members being located in said second case, each of said disk support members including a pair of disk holding portions movable into contact with peripheral portions of said disk, one of said disk holding portions on each of said disk support members being located in said first storage portion and the other of said disk holding portions of each of said disk support members being located in said second storage portion.

15. The cartridge according to claim 14, wherein each of said disk holding portions is engaged with a disk peripheral portion while said first and second cases are brought into contact with each other, and is disengaged from said disk peripheral portion when said first and second cases are separated from each other.

16. A cartridge for protecting an information storage disk, comprising:

a cartridge housing including a first case having a first storage portion with an open end for receiving a first part of said disk and a second case having a second storage portion with an open end for receiving a second part of said disk, said open end of said first case facing said open end of said second case; and means for guiding movement of said first and second cases between a closed state, in which said open ends of said first and second cases are in contact and said first and second cases enclose said disk, and an opened state, in which said open ends of said first and second cases are spaced apart to expose a preselected area of said disk between said first and second cases, said guiding means including first and second case support members slidably connected to said cartridge housing, extending in the direction of movement of said first and second cases, and positioned on diametrically opposite sides of said disk, each of said first and second case support members having a first end located in said first case and a second end located in said second case.

17. The cartridge according to claim 16, further comprising means for locking said first case to said second case when said first case is in contact with said second case.

18. The cartridge according to claim 17, wherein said locking means includes:

biasing means arranged at said first end of each of said case support members to cause each of said case support members to move in said first case;

a stop portion mounted at said second end of each of said case support members; and an abutment portion mounted in said second case for engagement with said stop portion, said stop portion being stopped by said abutment portion when said first case is in contact with said second case to lock said first case to said second case.

* * * * *